US007366600B2

(12) United States Patent
Osaki et al.

(10) Patent No.: US 7,366,600 B2
(45) Date of Patent: Apr. 29, 2008

(54) DISTRIBUTED CONTROL SYSTEM FOR FORKLIFT

(75) Inventors: Kuniharu Osaki, Tokyo (JP); Toru Saito, Tokyo (JP)

(73) Assignees: Mitsubishi Heavy Industries, Ltd., Tokyo (JP); Nissan Motor Co., Ltd., Kanagawa (JP)

( * ) Notice: Subject to any disclaimer, the term of this patent is extended or adjusted under 35 U.S.C. 154(b) by 603 days.

(21) Appl. No.: 10/855,438

(22) Filed: May 28, 2004

(65) Prior Publication Data

US 2004/0249538 A1 Dec. 9, 2004

(30) Foreign Application Priority Data

May 29, 2003 (JP) ............................ 2003-153383

(51) Int. Cl.
*G06F 19/00* (2006.01)
*F02D 29/02* (2006.01)

(52) U.S. Cl. .......................... 701/50; 701/33; 187/224; 187/222

(58) Field of Classification Search ..................... None
See application file for complete search history.

(56) References Cited

U.S. PATENT DOCUMENTS 1,409,202 A 3/1922 Sabattier
2,564,002 A 8/1951 Gibson
2,911,053 A 11/1959 Ayers et al.
3,265,150 A 8/1966 Westman
3,507,350 A 4/1970 Boyajian
3,700,062 A 10/1972 Garnett
4,019,602 A 4/1977 Habiger
4,091,889 A 5/1978 Brown et al.
4,136,752 A 1/1979 Friesen et al.
4,221,277 A 9/1980 Mastropieri
4,355,698 A 10/1982 Barnes et al.
4,383,412 A 5/1983 Presley
4,392,543 A 7/1983 Buckhouse et al.
4,398,618 A 8/1983 Hansen
4,883,137 A 11/1989 Wanie et al.
5,109,945 A 5/1992 Koga
5,203,440 A 4/1993 Peterson, Jr. et al.

(Continued)

FOREIGN PATENT DOCUMENTS

CN 1219498 A 6/1999

(Continued)

OTHER PUBLICATIONS

Japanese Office Action issued Jan. 25, 2008 in Japanese Application No. 2003-153383.

*Primary Examiner*—Lincoln Donovan
*Assistant Examiner*—Eduardo Colon
(74) *Attorney, Agent, or Firm*—Wenderoth, Lind & Ponack, L.L.P.

(57) ABSTRACT

A distributed control system including a plurality of controllers mounted on a forklift, and a network providing connections between or among the plurality of controllers within the forklift. A first controller out of the plurality of controllers is configured to control a function in response to an interfacing signal received from a second controller out of the plurality of controllers. When not receiving the interfacing signal during a predetermined period, the first controller controls the function using data stored in the first controller in place of the interfacing signal.

21 Claims, 7 Drawing Sheets

U.S. PATENT DOCUMENTS

| | | | | |
|---|---|---|---|---|
| 5,652,486 | A * | 7/1997 | Mueller et al. | 318/369 |
| 5,687,081 | A | 11/1997 | Wellman et al. | |
| 5,938,710 | A * | 8/1999 | Lanza et al. | 701/50 |
| 6,092,976 | A | 7/2000 | Kamiya | |
| 6,496,885 | B1 * | 12/2002 | Smart et al. | 710/100 |
| 6,553,290 | B1 * | 4/2003 | Pillar | 701/33 |
| 6,606,670 | B1 * | 8/2003 | Stoneking et al. | 710/14 |
| 6,655,351 | B2 * | 12/2003 | Sheidler et al. | 123/396 |
| 6,665,601 | B1 * | 12/2003 | Nielsen | 701/50 |
| 6,718,279 | B2 * | 4/2004 | Bustgens et al. | 702/151 |
| 2003/0195680 | A1 * | 10/2003 | Pillar | 701/33 |
| 2005/0102430 | A1 * | 5/2005 | Huber et al. | 709/250 |
| 2005/0254518 | A1 * | 11/2005 | Fujimori | 370/466 |
| 2006/0041350 | A1 * | 2/2006 | Hoshaw | 701/36 |
| 2006/0064215 | A1 * | 3/2006 | Turski et al. | 701/41 |
| 2006/0247831 | A1 * | 11/2006 | Shimokoshi | 701/29 |
| 2006/0260877 | A1 * | 11/2006 | Ito et al. | 187/224 |
| 2007/0050115 | A1 * | 3/2007 | Discenzo et al. | 701/50 |
| 2007/0074923 | A1 * | 4/2007 | Billger | 180/330 |

FOREIGN PATENT DOCUMENTS

| | | |
|---|---|---|
| DE | 25 48 856 | 5/1977 |
| JP | 60-46440 | 4/1985 |
| JP | 2-104926 | 4/1990 |
| JP | 6-137423 | 5/1994 |
| JP | 6-305339 | 11/1994 |
| JP | 8-253956 | 10/1996 |
| JP | 10-276509 | 10/1998 |
| JP | 10-280488 | 10/1998 |
| JP | 11-81392 | 3/1999 |
| JP | 2001-328800 | 11/2001 |
| JP | 2002-332910 | 11/2002 |

* cited by examiner

DISTRIBUTED CONTROL SYSTEM FOR FORKLIFT

BACKGROUND OF THE INVENTION

1. Field of the Invention

The present invention is generally related to forklifts including distributed control systems, more particularly, to cooperative control using distributed control systems within forklifts.

2. Description of the Related Art

Recently, an increasing number of engine-driven vehicles, including forklifts and construction machines, adopt electronic control systems. Electronic control systems use stored computer programs and control data for controlling respective devices within vehicles.

One requirement of recent forklifts is reduction in size of control systems. Recent advance in forklifts components requires control systems to be highly specified, and this leads to increase in the number of signal cables, and also increase in the size of the control systems. Increase in the size of control systems is undesirable, especially for size-reduced forklifts.

Another requirement is improved flexibility and adaptability of control systems. Control systems are often required to be dedicatedly designed, because functions of forklifts may be different depending on models or installed options. Additionally, in order to modify the performance of forklift components, the computer programs and control data often need to be modified for adapting operational environments of forklifts. A highly adaptable control system is one solution for providing various dedicated controllers and highly adapting operational environments.

U.S. Pat. No. 5,687,081 discloses a lift track control system with improved adaptability. The disclosed control system is composed of control modules which are software configurable and can receive software from a removable programmable cartridge. The control modules allows the hardware component of the control system to be mounted on a wide range of the lift track, then configured with boot and application software appropriate for the specific model and associated accessories.

Additionally, Japanese Laid Open Patent Application (JP-A-Heisei 10-280488) discloses a construction machine including a distributed controller. The architecture of the construction machine is capable of failure diagnosis of the distributed controller. The distributed controller includes input/output controllers, and a main controller provided with failure diagnosis means for detecting failure of the input/output controllers. The failure diagnosis means monitors data received from the input/output controllers, and determines that a specific input/output controller experiences failure when not receiving data from the specific input/output controller for a given period.

Furthermore, Japanese Laid Open Patent Application (JP-A-Heisei 10-276509) discloses a sub-controller configured to provide interface between tractor accessories and a tractor controller unit for reducing the number of input/output terminals of the tractor controller unit. The sub-controller is composed of a communication interface for communication of the tractor controller unit, a CPU which processes signals received from the tractor controller unit, a RAM card used for storing work data obtained through the signal processing, and an output interface for driving motors of the tractor accessories.

Japanese Laid Open Patent Application (JP-A-Heisei 8-253956) discloses an electrical control system of a construction machine for improving flexibility of the system, vibration and noise tolerances, and ease of maintenance. The electrical control system is composed of three or more controllers configured to control a hydraulic system to operate the construction machine. One of the controllers is used as a main controller, and remainders are grouped into first and second groups. The controllers of the first group receive signals from input devices and sensors to develop control data. The controllers of the second group generate drive signals to operate components of the hydraulic system in response to the control data received from the first group of controllers. The main controller manages the controllers of both of the first and second groups.

Japanese Laid Open Patent Application (JP-A-Heisei 11-81392) discloses an automatic construction machine for improving safety and unit protection. The automatic construction machine is composed of a plurality of controllers connected through a LAN. The plurality of control includes a safety/protection controller. The safety/protection controller is connected to a remainder of controllers through another independent network. The safety/protection controller exchanges safety/protection signals through both the LAN and the independent network.

Finally, Japanese Laid Open Patent Application (Jp-A-2001-328800) discloses a control system suitable for industrial machines for reducing the size, cost, and influences caused by failure of the system. The control system is composed of a plurality of controllers connected through a network. The structure of the control system in the time domain includes a plurality of operation modes. The controllers are associated with the operation modes, and configured to achieve desired control when the control system is placed in the associated operation modes. This architecture eliminates a need for providing a mode controller, and this effectively reduces the size and cost of the system.

BRIEF DESCRIPTION OF THE INVENTION

The present invention generally addresses an improvement of a distributed control system within a forklift.

Specifically, an object of the present invention is to provide a distribution control system for improving safety of a forklift.

Another object of the present invention is to provide a distribution control system for improving adaptability and flexibility.

Still another object of the present invention is to provide a distribution control system for facilitating the detection of the failure of the controllers, and the determination of the failed location.

Yet still another object of the present invention is to provide a distribution control system for reducing the size so as to be installed within a size-reduced forklift model.

In an aspect of the present invention, a distributed control system is includes a plurality of controllers mounted on a forklift, and a network providing connections between or among the plurality of controllers within the forklift. A first controller out of the plurality of controllers is configured to control a function in response to an interfacing signal received from a second controller out of the plurality of controllers. When not receiving the interfacing signal during a predetermined period, the first controller controls the function using data stored in the first controller in place of the interfacing signal.

When the distributed control system additionally includes a display unit connected to the network, and the forklift includes internal combustion engine, it is preferable that one of the first and second controllers is an engine controller, while another of the first and second controllers is a vehicle controller. Further, it is preferable that the vehicle controller generates a plurality of forklift component control signals for controlling forklift components in response to forklift component signals received from forklift components within the forklift. In addition, it is preferable that the engine controller generates a plurality of engine control signals for controlling the engine in response to a plurality of engine signals received from engine components within the engine, and it is preferable that the display unit displays at least one of the plurality of forklift component signals, the plurality of forklift component control signals, the plurality of engine signals, and the plurality of engine control signals.

In this case, the vehicle controller preferably outputs at least one selected forklift component signal out of the forklift component signals, and the forklift components control signals to provide for the engine controller. The engine controller is configured to receive the selected forklift component signal as the interfacing signal, and to generate at least one of the plurality of the engine control signals in response to the selected forklift component signal.

It is further preferable that the engine controller uses stored data therein in place of the selected forklift component signal, and generates a first alarm signal, when not receiving the selected forklift component signal during a predetermined period. It is also preferable that the display unit displays a first alarm informing that the engine controller does not receive the selected forklift component signal in response to the first alarm signal.

It is also preferable that the selected forklift component signal includes a vehicle speed signal indicative of a speed of the forklift, and a vehicle speed limit signal indicative of a speed limit of the forklift, and that the plurality of the engine signals includes an accelerator sensor signal indicative of a state of an accelerator pedal of the forklift. The plurality of the engine control signal includes a fuel injection rate signal indicative of an injection rate of the engines. The engine controller generates the fuel injection rate signal in response to the vehicle speed signal, the vehicle speed limit signal, and the fuel injection rate signal.

In another preferred embodiment, the engine controller outputs a selected engine signal out of the engine signals, and the engine control signals to provide for the vehicle controller. The vehicle controller is configured to receive the selected engine signal as the interfacing signal, and configured to generate at least one of the plurality of the forklift component control signals in response to the selected engine signal.

In this case, the vehicle controller preferably uses stored data therein in place of the selected engine signal when not receiving the selected engine signal during a predetermined period, and generates a second alarm signal. The display unit displays a second alarm informing that the vehicle controller does not receive the selected engine signal in response to the second alarm signal.

It is further preferable that the selected engine signal includes a rotation speed signal indicative of a rotation speed of the engine, and that the plurality of forklift component signals includes a sitting detection signal indicative of whether an operator is seated on a driver seat of the forklift. The plurality of forklift component control signals includes a transmission control signal for controlling a transmission of the forklift, and the vehicle controller generates the transmission control signal in response to the rotation speed signal and the sitting detection signal.

In still another preferred embodiment, the plurality of controllers includes a finger chip controller controlling a finger chip control module. The finger chip control module is disposed beside a driver seat to control forks and mast in response to actuation of finger-operable lever on the finger chip control module.

In yet still another preferred embodiment, the engine controller is disposed beside the engine, and the vehicle controller is positioned immediately inside a pivotable hatch of a body of the forklift.

In another aspect of the present invention, a forklift is composed of a forklift body, and the aforementioned distributed control system.

Another aspect of the present invention includes a method for operating a distributed control system within a forklift. The method includes:

(a) transmitting an interfacing signal to a first controller out of a plurality of controllers from a second controller out of the plurality of controllers, wherein the plurality of controllers are connected through a network and configured to control functions of the forklift;

(b) first controlling a first function using the first controller in response to the interfacing signal;

(c) second controlling the first function using the first controller using stored data in the first controller in place of the interfacing signal when not receiving the interfacing signal during a predetermined period.

Another aspect of the present invention includes a computer program stored on a computer readable storage medium. The computer program is for operating a distributed control system including a plurality of controllers connected through a network. The computer program causing a computer to execute a method including: operating a second controller out of the plurality of controllers to transmit an interfacing signal to a first controller out of the plurality of controllers, operating the first controller to control a first function in response to the interfacing signal, operating the first controller to control the first function using stored data in the first controller in place of the interfacing signal when not receiving the interfacing signal during a predetermined period.

DETAILED DESCRIPTION OF THE INVENTION

Preferred embodiments of the present invention are described below in detail with reference to the attached drawings.

System Structure

Figure 1:
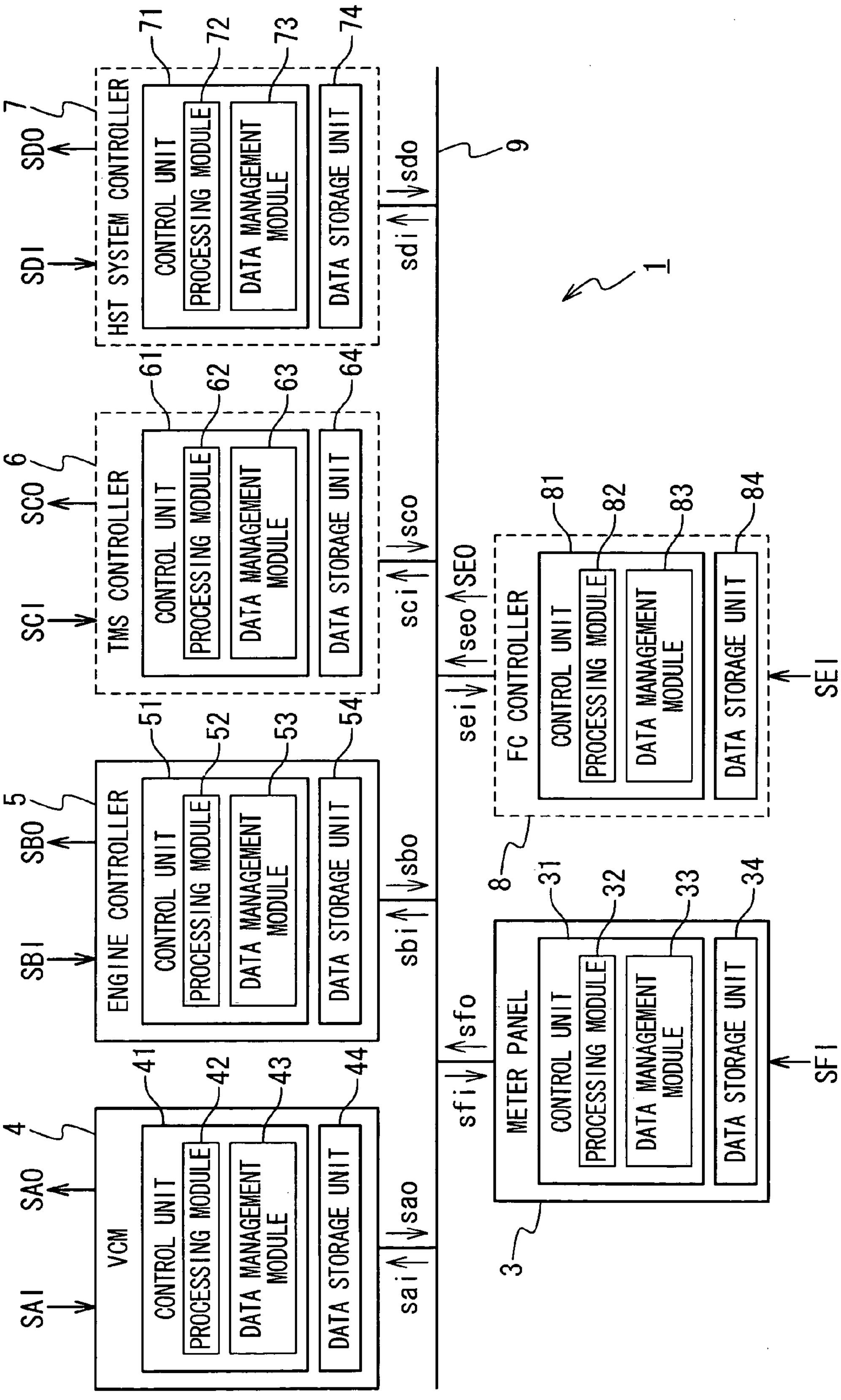
FIG. 1 is a block diagram illustrating a structure of a distributed control system in an embodiment of the present invention.

In one embodiment, as shown in FIG. 1, a distributed control system 1, which is mounted on a forklift with an internal combustion engine (not shown), is configured to control various functions in response to signals received from the forklift components.

The distributed control system 1 includes a meter panel 3, a vehicle control module (VCM) 4, an engine controller 5, and a CAN (controller area network) bus 9. The vehicle control module 4 provides various functions through controlling various forklift components. The engine controller 5 is a dedicated controller for controlling functions in connection with an engine within the forklift. The CAN bus 9 provides interactive connections among the meter panel 3, the vehicle control module 4, and the engine controller 5, which operate according to the CAN protocol. The CAN protocol is a well-known data communication protocol for controllers.

The distributed control system 1 may additionally include a TMS (truck management system) controller 6, an HTS (hydrostatic transmission) drive controller 7 and a FC (finger chip) controller 8 in order to partially undertake functions of the vehicle control module 4 and the engine controller 5, or to provide additional functions for the system 1. The TMS controller 6 is used to control functions of material handling equipment, including a pair of forks, and a mast. The HTS drive controller 7 is a dedicated system for controlling functions of a hydrostatic transmission system within the forklift. The FC controller 8 is a console for facilitating manipulations of the forklift; the FC controller 8 allows the operator to operate the forklift components by finger-operable levers instead of a lift lever, a tilt lever, a fork-leveling switch, and a forward and reverse lever and so forth.

In this embodiment, the distributed control system 1 is configured to allow the aforementioned controllers, which are dedicated for controlling the associated functions of the forklift, to exchange interfacing signals between each other using the CAN bus 9, and to thereby mutually monitor the operations and states of the controllers using the interfacing signals. This achieves cooperative operation of the controllers within the distribution control system 1.

Vehicle Control Module

The vehicle control module 4 generates a set of forklift component control signals SAO to control the functions of the associated forklift components in response to a set of forklift component signals SAI, and/or a plurality of interfacing signals sai received from other controllers.

The forklift component signals SAI include sensor signals received from sensors disposed within the forklift, and manipulating signals inputted to the vehicle control module 4 in response to manual operation by an operator. The sensor signals are indicative of states of the forklift components within the forklift, typically including a vehicle speed signal received from a vehicle speed sensor to indicate the vehicle speed, including hydraulic pressure signals received from hydraulic pressure sensors to indicate the hydraulic pressure at the various positions of a hydraulic system within the hydraulic system, including a fork position signal received from a fork sensor to indicate the position of the fork, including a mast angle signal received from the angle sensor to indicate a tilt angle of the mast, and including alarm signals for alarming failures of various components. The manipulating signals, on the other hand, typically include a steering wheel signal received from a steering wheel sensor to indicate the position or displacement of the steering wheel, include a joystick signal received from a joystick sensor to indicate the displacement of a joystick used for manipulating the forks and the mast, include a sitting detection signal from a sitting detection sensor which detects whether an operator (or a driver) is at the driving seat, and include a seatbelt signal indicative of whether the operator has fastened a seatbelt.

The forklift component control signals SAO, which are outputted from the vehicle control module 4, typically include a T/M (transmission) control signal for controlling a transmission within the forklift, wheel control signals for controlling directions of wheels, a fork control signal for controlling the movement of the forks, and a mast control signal for controlling the movement of the mast.

Additionally, the vehicle control module 4 selectively outputs one or more of the forklift component signals SAI and the forklift component control signals SAO to other desired controllers. The selectively output signals are referred to as selected forklift component signals sao. The selected forklift component signals sao are used as the interfacing signals by other controllers. The selected forklift component signals sao typically include the vehicle speed signals outputted to the meter panel 3 and the engine controller 5, and a vehicle speed limit signal previously stored in the vehicle control module 4.

Specifically, the vehicle control module 4 includes a control unit 41 and a data storage unit 44. The control unit 41 may include a CPU and the data storage unit 44 may include a memory such as a ROM and a RAM.

The control unit 41 includes a processing module 42, and a data management module 43 to execute various information processing. The processing module 42 and the data management module 43 are computer program modules installed within a storage device.

The data management module 43 receives and manages the set of forklift component signals SAI and the interfacing signals sai from other controllers. When not receiving any of the signals to be received, the data management module 43 outputs an alarm signal to the meter panel 3. Additionally, the data management module 43 outputs the plurality of forklift component control signals SAO and the selected forklift component signals sao to other desired controllers at predetermined intervals. If necessary, the data management module 43 stores the received signals on the data storage unit 44.

The processing module 42 performs predetermined processing in response to the forklift component signals SAI, and/or the interfacing signals sai received from other controllers to generate the set of the forklift component control signals SAO. In the case when the data management module 43 fails to receive any of the signals to be received, the processing module 42 performs the process using data stored in the data storage unit 44 instead of the failed signals.

The data storage unit 44 stores therein the data necessary for the control unit 41 to execute the processing, and the data to be outputted to the forklift components and other controllers. The data necessary for the processing includes the data of the forklift component signals SAI, the data of the interfacing signals sai received from other controllers, the predetermined data set used in the case when any of the forklift component signals SAI and the interfacing signals sai are not received as desired, the desired value data, and so forth.

Engine Controller

The engine controller 5 outputs a set of engine control signals SBO to control the engine in response to a plurality of engine signals SBI and/or the interfacing signals sbi received from other controllers.

The engine signals SBI are composed of engine sensor signals received from sensors on the engine, and engine manipulating signals inputted to the engine controller 5 in response to manual operation by the operator. The engine sensor signals typically include a rotation speed signal indicative of the rotation speed of the engine, a temperature signal indicative of the temperature of the engine, and alarm signals for indicating a failure of engine components. The engine manipulating signals typically include an accelerator sensor signal received from an accelerator sensor to indicate the position or angle of an accelerator pedal, and a brake sensor signal received from a brake sensor to indicate the position or angel of a brake pedal.

The engine control signals SBO typically include a fuel control signal for controlling a fuel injection rate of the engine, and an ignition control signal for controlling ignition timing of the engine.

The engine controller 5 additionally outputs one or more of the engine signals SBI and the engine control signal SBO. The outputted signals are referred to as selected engine signals sbo. The selected engine signals sbo typically include a rotation speed signal, and an accelerator sensor signal outputted to the vehicle controller module 4.

Specifically, the engine controller 5 includes a control unit 51 and a data storage unit 54. The control unit 51 may include a CPU and the data storage unit 54 may include a memory such as a ROM and a RAM.

The control unit 51 includes a processing module 52, and a data management module 53 to execute various information processing. The processing module 52 and the data management module 53 are computer program modules installed within a storage device.

The data management module 53 receives and manages the set of engine signals SBI and the interfacing signals sbi from other controllers. When not receiving any of the signals to be received, the data management module 53 outputs an alarm signal to the meter panel 3. Additionally, the data management module 53 outputs the plurality of engine control signals SBO and the selected engine signals sao to desired other controllers at predetermined intervals. If necessary, the data management module 53 stores the received signals into the data storage unit 54.

The processing module 52 performs predetermined processing in response to the engine signals SBI, and/or the interfacing signals sbi received from other controllers to generate the set of the engine control signals SBO. In the case when the data management module 53 fails to receive any of the signals to be received, the processing module 52 performs the process using data stored in the data storage unit 54 instead of the failed signals.

The data storage unit 54 stores therein the data necessary for the control unit 51 to execute the processing, and the data to be outputted to the engine and other controllers. The data necessary for the processing includes the data of the engine signals SBI, the data of the interfacing signals sbi received from other controllers, the predetermined data set used in the case when any of the engine signals SBI and the interfacing signals sbi are not received as desired, the desired value data and so forth.

Meter Panel

The meter panel 3 is a display device used for displaying various data in response to a plurality of forklift component state signals SFI and various interfacing signals sfi. The forklift component state signals SFI typically include sensor signals received from the associated forklift components and meter manipulation signals inputted to the meter panel 3 in response to manual operation of the operator. The sensor signals typically include a shift lever signal representative of the position of the shift lever, which is selected out of the drive, neutral and reverse positions, and include alarm signals for alarming failure of various components within the forklift. The meter manipulation signals typically include a display request signal requesting a data to be displayed on the meter panel 3.

Additionally, the meter panel 3 selectively outputs one or more of the forklift component state signals SFI to other desired controllers. The outputted signals are referred to as selected forklift component state signals sfo. The selected forklift component state signals sfo typically include a shift lever signal outputted to the vehicle control module 4.

Specifically, the meter panel 3 includes a control unit 31 and a data storage unit 34. The control unit 31 may include a CPU and the data storage unit 34 may include a memory such as a ROM and a RAM.

The control unit 31 performs information processing to display the forklift component state signals SFI and the interfacing signals sfi under the display conditions stored in the data storage unit 34.

In detail, the control unit 31 includes a processing module 32, and a data management module 33, which are computer program modules installed within a storage device. The data management module 33 receives and manages the set of forklift component state signals SFI and the interfacing signals sfi from other controllers. When not receiving any of the signals to be received, the data management module 33 outputs an alarm signal to the meter panel 3. Additionally, the data management module 33 outputs the selected forklift component state signals sfo to other desired controllers at predetermined intervals. If necessary, the data management module 33 stores the received signals into the data storage unit 34.

The processing module 32 performs the predetermined processing to display various data in response to the forklift component state signals SFI, and/or the interfacing signals sfi received from the other controllers under the aforementioned predetermined conditions.

The data storage unit 34 stores therein the data necessary for the control unit 31 to execute the processing, and the data to be outputted to the forklift components and other controllers. The data necessary for the processing includes the data of the forklift component state signals SFI, the data of the interfacing signals sfi received from other controllers, the predetermined data set used in the case when any of the signals are not received as desired, the display condition data, and so forth.

FC Controller

As described above, the FC (Finger Chip) controller 8 is an optional accessory used to facilitate manipulation of the forklift. The FC controller 8 is a control apparatus for a FCM (Finger Chip Control Module) including finger-operable levers for operation of the forklift in place of the lift lever, the fork leveling switch, and the tilt lever. The finger-operable levers are installed over an armrest of the driver seat. When the FC controller 8 is installed in the forklift, the FC controller 8 is used for operating the forks and mast in place of the vehicle controller module 4. The output of the FC controller 8 is transmitted to the vehicle control module 4.

The FC controller 8 outputs a plurality of operation control signals SEO to control the operation of the forklift in response to operation signals SEI associated with material handling, and interfacing signals sei received from other controllers.

The operation signals SEI typically include a handling lever signal indicative of the position of a fork/mast lever used for operating the fork and the mast, and a drive lever signal indicative of the position of a forward and reverse lever used to allow the forklift to travel backward and forward.

The operation control signals SEO typically include a fork control signal for controlling movement of the forks, a mast control signal for controlling movement of the mast, and a forward and reverse signal for prohibiting the forward or reverse travel of the forklift.

Additionally, the FC controller 8 selectively outputs one or more of the operation signals SEI and the operation control signals SEO to desired other controllers. The outputted signals are referred to as selected material handling signal seo. The selected material handling signal seo includes all of the operation control signals SEO outputted to the vehicle control module 4.

Specifically, the FC controller 8 includes a control unit 81 and a data storage unit 84. The control unit 81 may include a CPU and the data storage unit 84 may include a memory such as a ROM and a RAM.

The control unit 81 includes a processing module 82, and a data management module 83 to execute various information processing. The processing module 82 and the data management module 83 are computer program modules installed within a storage device.

The data management module 83 receives and manages the set of operation signals SEI and the interfacing signals sei from other controllers. When not receiving any of the signals to be received, the data management module 83 outputs an alarm signal to the meter panel 3. Additionally, the data management module 83 outputs the plurality of operation control signals SEO and the selected material handling signal seo to desired ones of the other controllers at predetermined intervals. If necessary, the data management module 83 stores the received signals on the data storage unit 84.

The processing module 82 performs predetermined processing in response to the operation signals SEI, and/or the interfacing signals sei received from other controllers to generate the set of the operation control signals SEO. In the case when the data management module 83 fails to receive any of the signals to be received, the processing module 82 performs the process using data stored in the data storage unit 84 instead of the failed signals.

The data storage unit 84 stores therein the data necessary for the control unit 81 to execute the processing, and the data to be outputted to the forklift components and other controllers. The data necessary for the processing includes the data of the operation signals SEI, the data of the interfacing signals sei received from other controllers, the predetermined data set used in the case when any of the operation signals SEI and the interfacing signals sei are not received as desired, the desired value data, and so forth.

TMS Controller

As described above, the TMS controller 6 is another optional accessory used to operate the forks and the mast of the forklift. When installed in the forklift, the TMS controller 6 is used for operating the forks and mast in place of the vehicle controller module 4.

The TMS controller 6 generates a plurality of material handling control signals SCO to control the forks and the mast, in response to a plurality of material handling machine signals SCI received from mechanisms operating the forks and the mast within the fork lift and/or interfacing signals sci received from other controllers.

The material handling machine signals SCI includes material handling machine sensor signals and manipulating signals inputted to the TMS controller 6 in response to manual operation by the operator. The sensor signals includes a fork position signal received from a fork position sensor to indicate the positions of the forks, a mast angle signal received from an mast angle sensor to indicate a tilt angle of the mast, a fork speed signal received from a fork speed sensor to indicate the fork speed, a fork load signal received from a fork load sensor to indicate a load exerted on the forks, and alarm signals for alarming failure of the material handling mechanisms. The manipulating signals includes a joystick signal received from a joystick used for manipulating the forks and mast to indicate the position of the joystick, and a fork speed switch signal for switching the fork speeds.

The material handling control signals SCO typically include a fork control signal for controlling movement of the forks, a mast control signal for controlling movement of the mast, and a fork damping signal for limiting the fork speed.

Additionally, the TMS controller 6 outputs one or more of the material handling machine signals SCI and the material handling control signals SCO to other desired controllers. The outputted signals are referred to as selected material handling machine signals sco. The selected material handling machine signals sco typically include a fork speed signal indicative of the fork speed.

Specifically, the TMS controller 6 includes a control unit 61 and a data storage unit 64. The control unit 61 may include a CPU and the data storage unit 64 may include a memory such as a ROM and a RAM.

The control unit 61 includes a processing module 62, and a data management module 63 to execute various information processing. The processing module 62 and the data management module 63 are computer program modules installed within a storage device.

The data management module 63 receives and manages the material handling machine signals SCI and the interfacing signals sci from other controllers. When not receiving any of the signals to be received, the data management module 63 outputs an alarm signal to the meter panel 3. Additionally, the data management module 63 outputs the material handling control signals SCO and the selected material handling machine signals sco to desired other controllers at predetermined intervals. If necessary, the data management module 63 stores the received signals on the data storage unit 64.

The processing module 62 performs predetermined processing in response to the material handling machine signals SCI, and/or the interfacing signals sci received from other controllers to generate the material handling control signals SCO. In the case when the data management module 63 fails to receive any of the signals to be received, the processing module 62 performs the process using data stored in the data storage unit 64 instead of the failed signals.

The data storage unit 64 stores therein the data necessary for the control unit 61 to execute the processing, and the data to be outputted to the forklift components and other controllers. The data necessary for the processing includes the data of the material handling machine signals SCI, the data of the interfacing signals sci received from other controllers, the predetermined data set used in the case when any of the material handling machine signals SCI and the interfacing signals sci are not received as desired, the desired value data, and so forth.

HST Drive Controller

As described above, the HST drive controller 7 is still another optional accessory used to operate the hydrostatic transmission (HST) system of the forklift. When installed in the forklift, the HST drive controller 7 is used for operating the transmission in place of the vehicle controller module 4 and the engine controller 5.

The HST drive controller 7 generates a set of transmission control signals SDO to control the HST system in response to a set of transmission system signals SDI received from mechanisms within the HST system, and/or interfacing signals sdi received from other controllers.

The transmission system signals SDI includes sensor signals received from sensors disposed within the HST system, and manipulating signals inputted to the HST drive controller 7 in response to manual operation by the operator. The sensor signals includes a HST pump signal indicative of the state of a hydraulic pump, a HST motor signal indicative of the state of a hydraulic motor within the HST system, valve signals received from controlled valves to indicate the states of the valves, and alarm signals for indicating a failure of the mechanisms within the HST system. The manipulating signals typically include a twin pedal signal received from the twin pedals to indicate the forklift to travel backward or forward or to be placed in a neutral state.

The transmission control signals SDO typically include a HST pump control signal for controlling the hydraulic pump within the HST system, a HST motor control signal for controlling the hydraulic motor within the HST system, and an engine rotation speed signal for indicating the rotation speed of the engine.

Additionally, the HST drive controller 7 selectively outputs one or more of the transmission system signals SDI and the transmission control signals SDO. The outputted signals are referred to as selected transmission system signals sdo. The selected transmission system signals typically include the twin pedal signal.

Specifically, the HST drive controller 7 includes a control unit 71 and a data storage unit 74. The control unit 71 may include a CPU and the data storage unit 74 may include a memory such as a ROM and a RAM.

The control unit 71 includes a processing module 72, and a data management module 73 to execute various information processing. The processing module 72 and the data management module 73 are computer program modules installed within a storage device.

The data management module 73 receives and manages the transmission system signals SDI and the interfacing signals sdi from other controllers. When not receiving any of the signals to be received, the data management module 73 outputs an alarm signal to the meter panel 3. Additionally, the data management module 73 outputs the plurality of transmission system control signals SEO and the selected transmission system signals seo to desired other controllers at predetermined intervals. If necessary, the data management module 73 stores the received signals into the data storage unit 74.

The processing module 72 performs predetermined processing in response to the forklift component signals SAI, and/or the interfacing signals sai received from other controllers to generate the set of the forklift component control signals SAO. In the case when the data management module 73 fails to receive any of the signals to be received, the processing module 72 performs the process using data stored in the data storage unit 74 instead of the failed signals.

The data storage unit 74 stores therein the data necessary for the control unit 71 to execute the processing, and the data to be outputted to the forklift components and other controllers. The data necessary for the processing includes the data of the transmission system signals SDI, the data of the interfacing signals sdi received from other controllers, the predetermined data set used in the case when any of the transmission system signals SDI and the interfacing signals sdi are not received as desired, the desired value data, and so forth.

In this embodiment, the control unit and data storage unit may be monolithically integrated within a semiconductor device, such as a system LSI, in the respective controllers. For the vehicle control module 4, for instance, the control unit 41 and the data storage unit 44 may be monolithically integrated. The same goes for the other controllers. Monolithic integration of the control unit and data storage unit effectively reduces the size of the respective controllers. Additionally, this architecture allows the program and data stored in each controller to be independently modified by using a dedicated tool.

Schematic Arrangement of Forklift Components and Controllers

Figure 2:
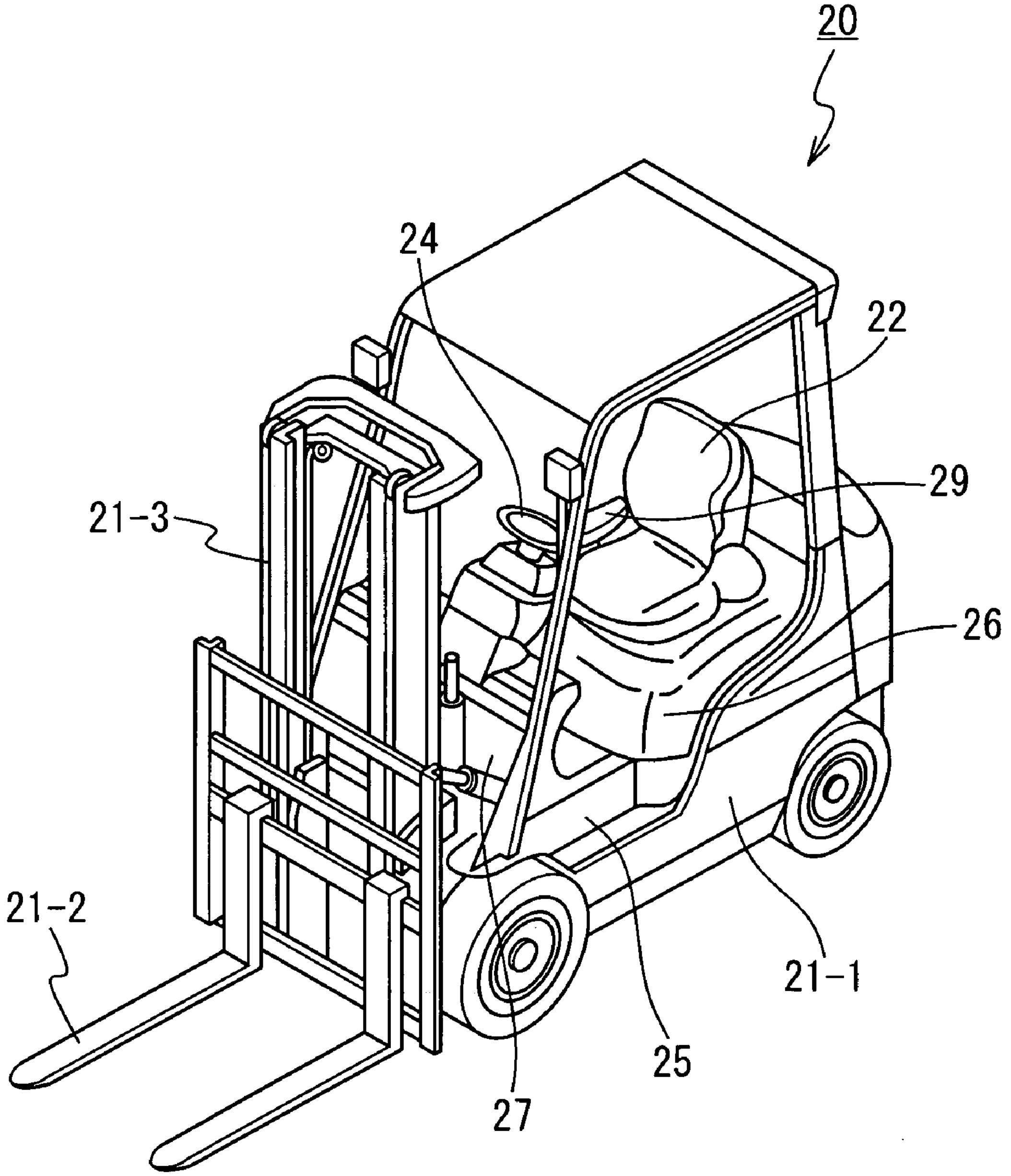
FIG. 2 is a perspective view illustrating a structure of a forklift equipped with the distributed control system.

FIG. 2 shows a perspective view of the forklift, designated by numeral 20. The forks, designated by numeral 21-2, and the mast, designated by numeral 21-3, are disposed at the front portion of a main body 21-1. The main body 21-1 is composed of a pedestal 26 to cover the engine (not shown in FIG. 2) on which a seat 22 for a driver is installed. A manipulating console 27 is arranged in front of the seat 22 to operate the forklift. The steering wheel 24 is provided on the manipulating console 27 to face the seat 22. A foot side cover 25 is provided for the body 21-1 at the foot portion between the pedestal 26 and the manipulating console 27.

Figure 3:
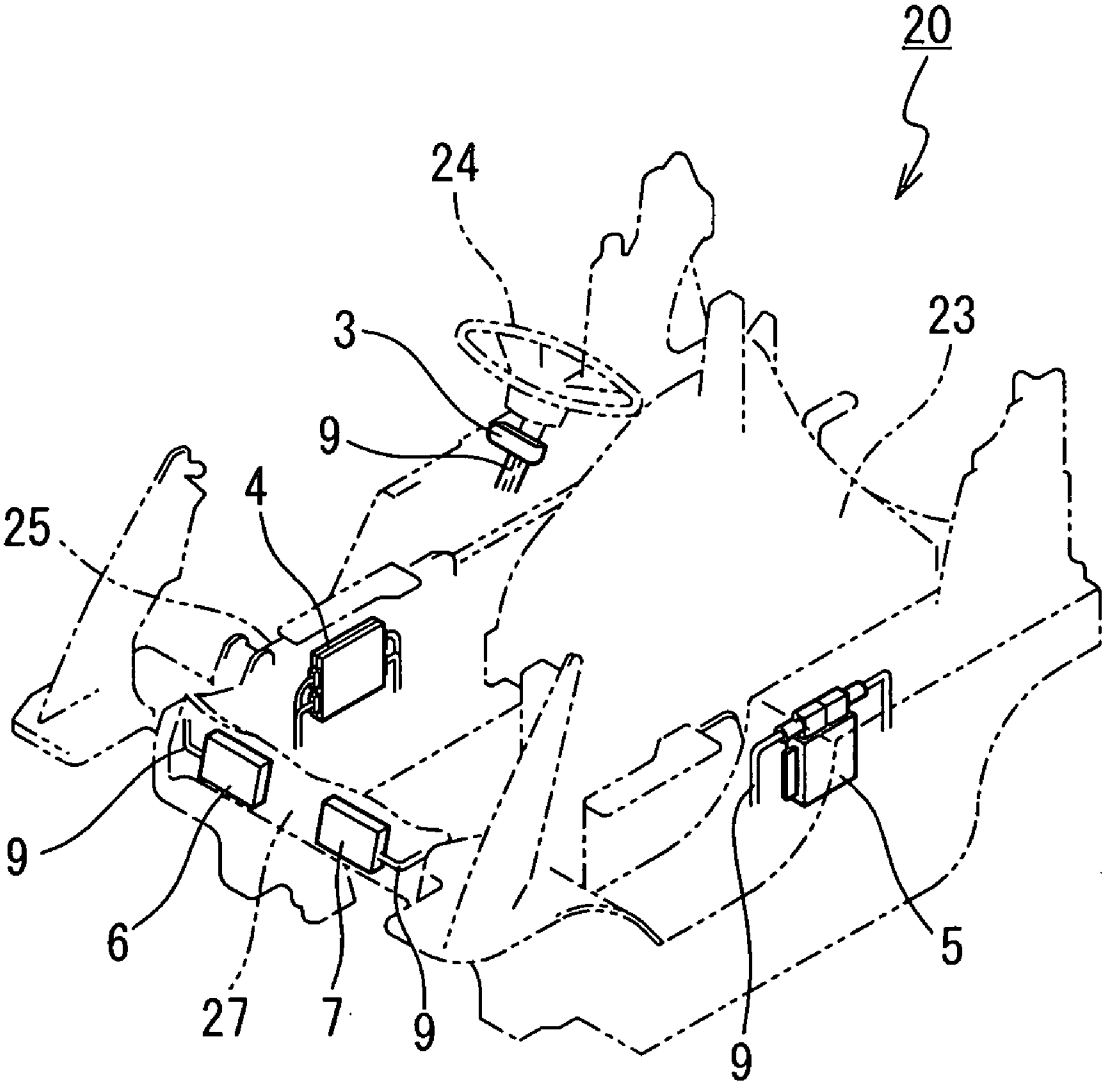
FIG. 3 is another perspective view illustrating the structure of the forklift.

FIG. 3 is a perspective view of the controllers installed within the forklift 20. The meter panel 3 is provided at the middle of a shaft of the steering wheel 24. The vehicle control module 4 is provided immediately inside of the foot side cover 25. A pivotable service hatch is provided near the vehicle control module 4 for the foot side cover 25 to allow the vehicle control module 4 to be easily accessed from outside. The engine controller 5 is provided beside the engine, designated by numeral 23. Positioning the engine controller 5 beside the engine 23 effectively reduces the lengths of the cables used for obtaining signals from the engine components. If required, the TMS controller 6 and the HST controller 7 may be disposed at the bottom portion of the manipulating console 27. The controllers and the meter panel 3 are interactively connected through a CAN bus 9.

Figure 4:
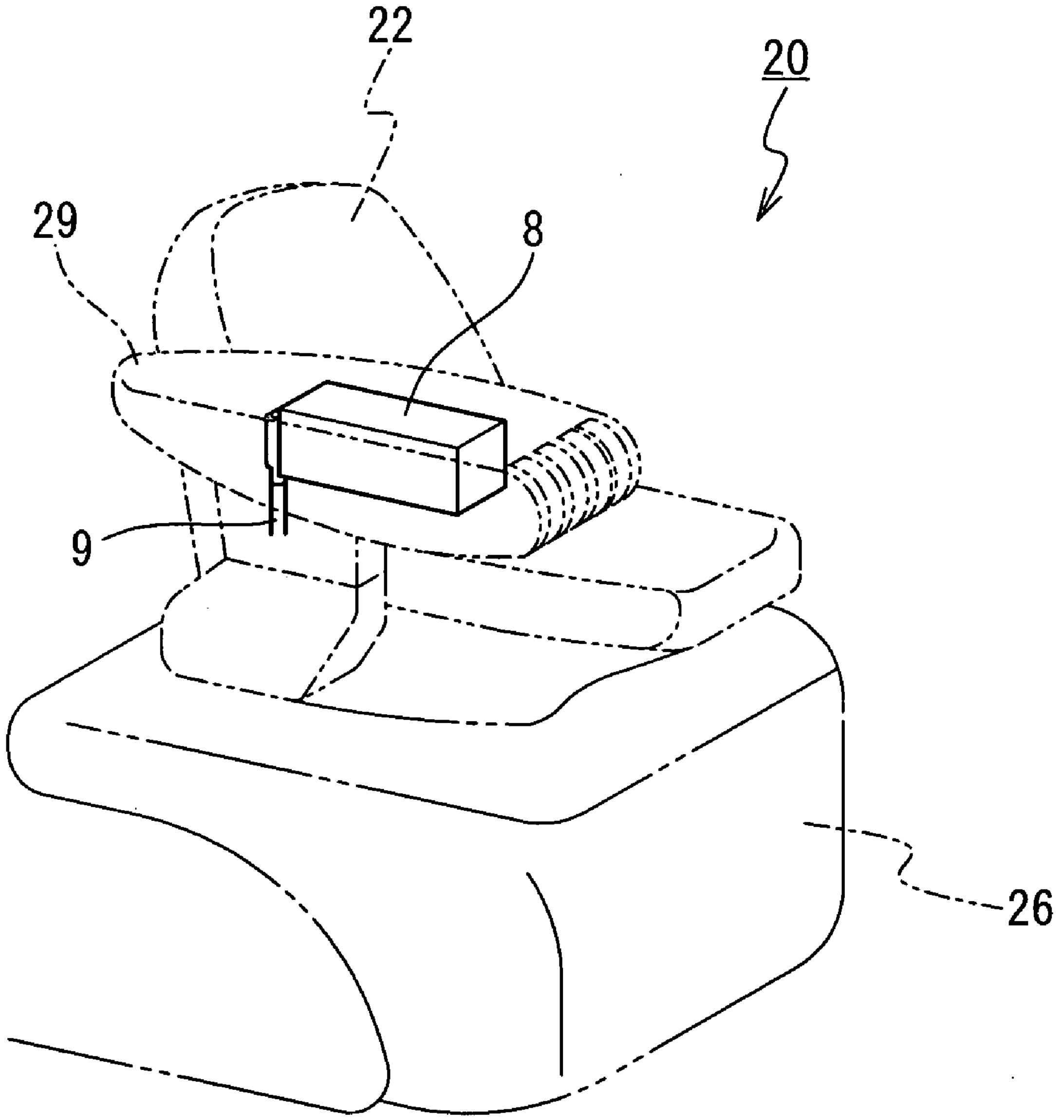
FIG. 4 is an enlarged perspective view illustrating the structure of the forklift.

FIG. 4 is another perspective view illustrating the controllers provided within the forklift 20. The forklift is illustrated in the opposite direction of FIG. 2. If requested, the FCM 29 is exemplarily disposed on a right armrest of the seat 22. The FC controller 8 is provided inside the right armrest and is connected with the other controllers through the CAN bus 9.

System Operation

Figure 5:
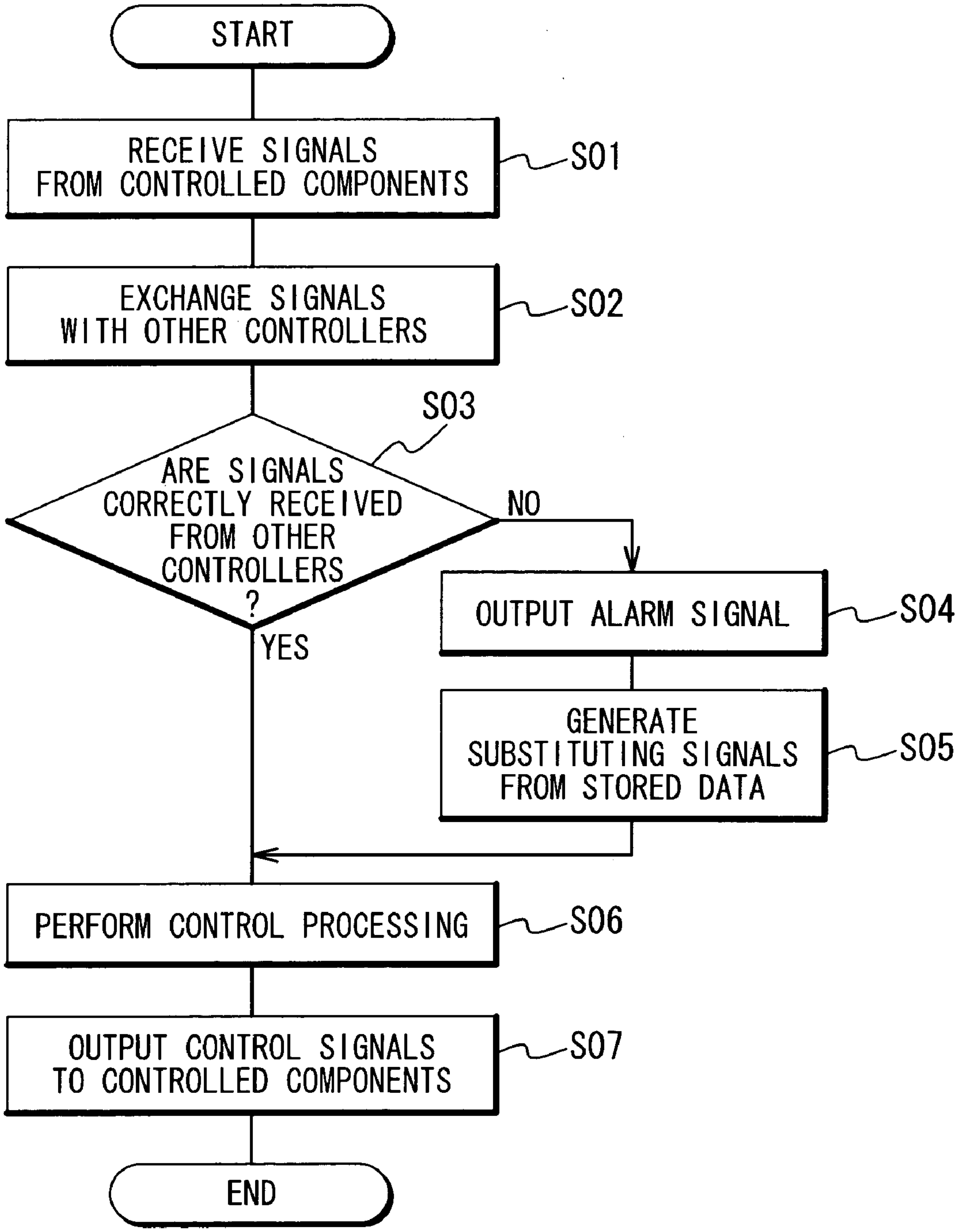
FIG. 5 is a flowchart illustrating the operation of the distributed control system in this embodiment.

FIG. 5 is a flowchart illustrating the operation of each controller (including the meter panel 3) within the distributed control system 1 in this embodiment. The operation of each controller is described below in detail.

(1) Operation of Engine Controller (1-1) Step S01

With reference to FIG. 5, the engine controller 5 receives the engine signals SBI from the engine components, which are controlled by the engine controller 5. In this embodiment, the engine signals SBI includes a rotation speed signal received from a rotation speed sensor, the rotation speed signal is indicative of the rotation speed of the engine.

(1-2) Step S02

The engine controller 5 exchanges signals with other desired controllers. The engine controller 5 transmits selected one(s) of the engine signals SBI, and receives interfacing signals sbi from associated other controllers. In this embodiment, the engine controller 5 forwards the rotation speed signal to the vehicle control module 4 at predetermined period intervals. The rotation speed signal is used by the destination, that is, the vehicle control module 4. Additionally, the engine controller 5 receives the vehicle speed signal and the vehicle speed limit signal from the vehicle control module 4 at predetermined period intervals.

(1-3) Step S03

The engine controller 5 determines whether or not the engine controller 5 receives the interfacing signals sbi from the associated controllers during a predetermined period. In this embodiment, the engine controller 5 determines whether it receives the vehicle speed signal and the vehicle speed limit signal from the vehicle control module 4 during a predetermined period. If the engine controller 5 receives the vehicle speed signal and the vehicle speed limit signal during the period, the procedure continues to Step S06. Otherwise, the procedure continues to Step S04.

(1-4) Step S04

If not receiving the interfacing signals sbi during the predetermined period, the engine controller 5 generates an alarm signal. That is, in this embodiment, in response to not receiving the vehicle speed signal and the vehicle speed limit signal during the predetermined period, the engine controller 5 generates an alarm signal to output to the meter panel 3. The meter panel 3 receives and displays the received alarm signal. The procedure then goes on to Step S05.

(1-5) Step S05

The engine controller 5 obtains the previously stored data in the data storage unit 54, and generates substituting signals to be used in the following steps in place of the interfacing signals sbi on the basis of the stored data. The previously stored data is prepared for dealing with failure of controllers.

In this embodiment, the engine controller 5 generates a substituting vehicle speed signal and a substituting vehicle speed limit signal on the basis of the stored data indicative of a predetermined speed and a predetermined speed limit. The substituting vehicle speed signal and the substituting vehicle speed limit signal are used in the following Step S06 in place of the vehicle speed signal and the vehicle speed limit signal, which are not received at Step S01. The predetermined speed and the predetermined speed limit are determined so as to ensure safe operation of the forklift.

(1-6) Step S06

The engine controller 5 performs predetermined control processing to generate control signals in response to the interfacing signals sbi received from the associated controllers or the substituting signals generated by the engine controller 5 itself. In this embodiment, the engine controller 5 produces a fuel control signal and an ignition control signal for the engine control signals SBO in response to the vehicle speed signal and the vehicle speed limit signal from the vehicle control module 4, or the substituting vehicle speed signal and vehicle speed limit signals generated by the engine controller 5 itself. The fuel control signal is used for controlling the fuel injection rate into the engine, and the ignition control signal is used for controlling the ignition timing of the engine.

(1-7) Step S07

The engine controller 5 outputs the control signals generated at Step S06 to the associated engine components. The engine controller 5 outputs the fuel control signal to a fuel injection system to control the fuel injection rate, and outputs the ignition control signal to an ignition system to control the ignition timing.

Figure 6:
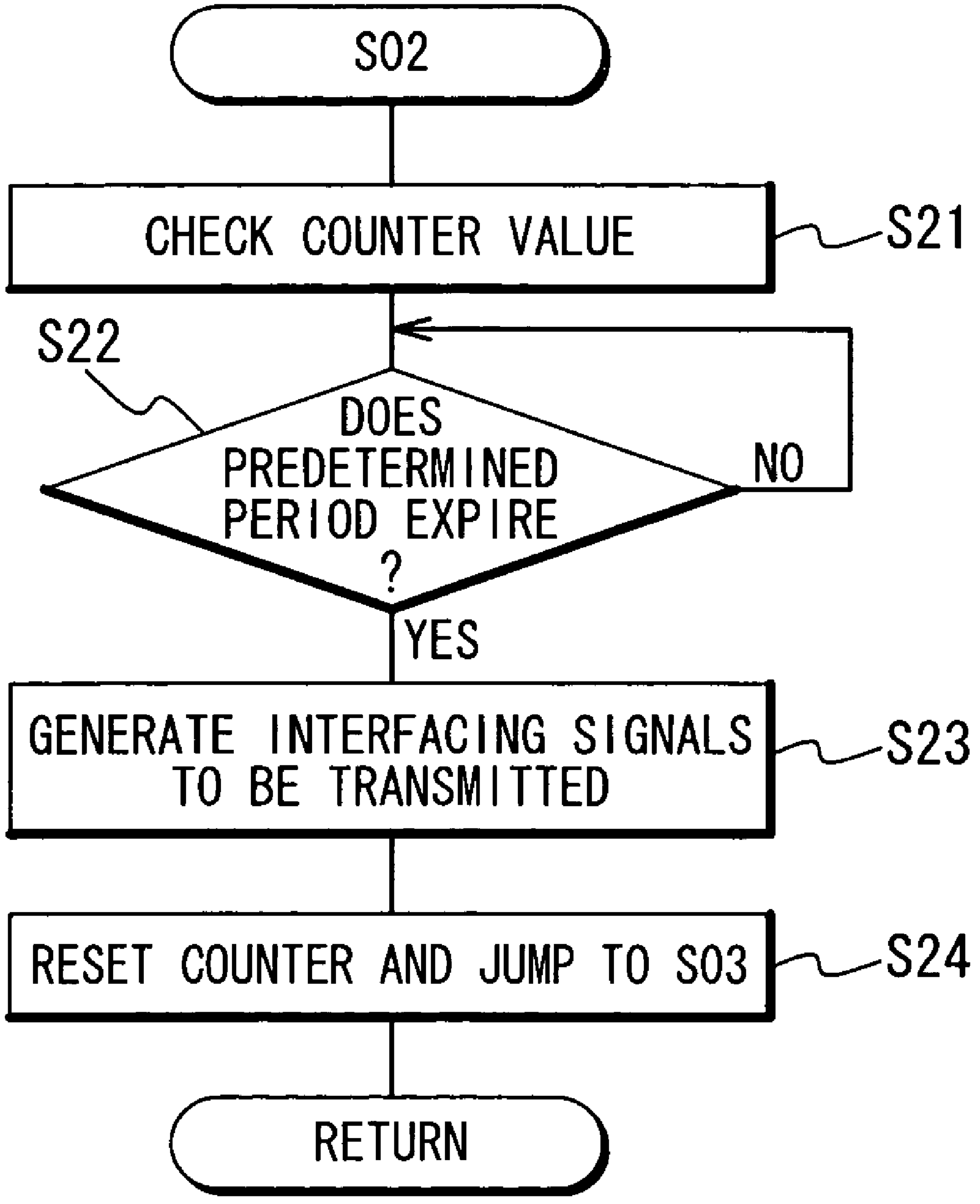
FIG. 6 is a flowchart illustrating the procedure of transmitting interfacing signals within the distributed control system in this embodiment.

The following is a detailed explanation of the procedure of sending signals at Step S02. FIG. 6 is a flow chart showing the detail of the process of the Step S02.

(1) Step S21

Each of the sending controllers (including the meter panel 3) checks a counter value of a program counter for the transmission within the control unit.

(2) Step S22

Each of the sending controllers checks whether a predetermined period expires on the basis of the counter value. The predetermined period is previously stored in the control unit.

(3) Step S23

Each of the sending controllers generates signals to be transmitted to the associated receiving controllers when the predetermined period expires. For the engine controller 5, the signals generated at Step S23 include the vehicle speed signal and the vehicle speed limit signal. The sending controller provides the generated signals to the associated receiving controllers (including the meter panel 3).

(4) Step S24

The sending controller resets the counter value of the program counter. Then, the procedure goes on to Step 03.

The procedure of receiving the signals at Step S03 is performed as described in the following.

(1) Step S31

Figure 7:
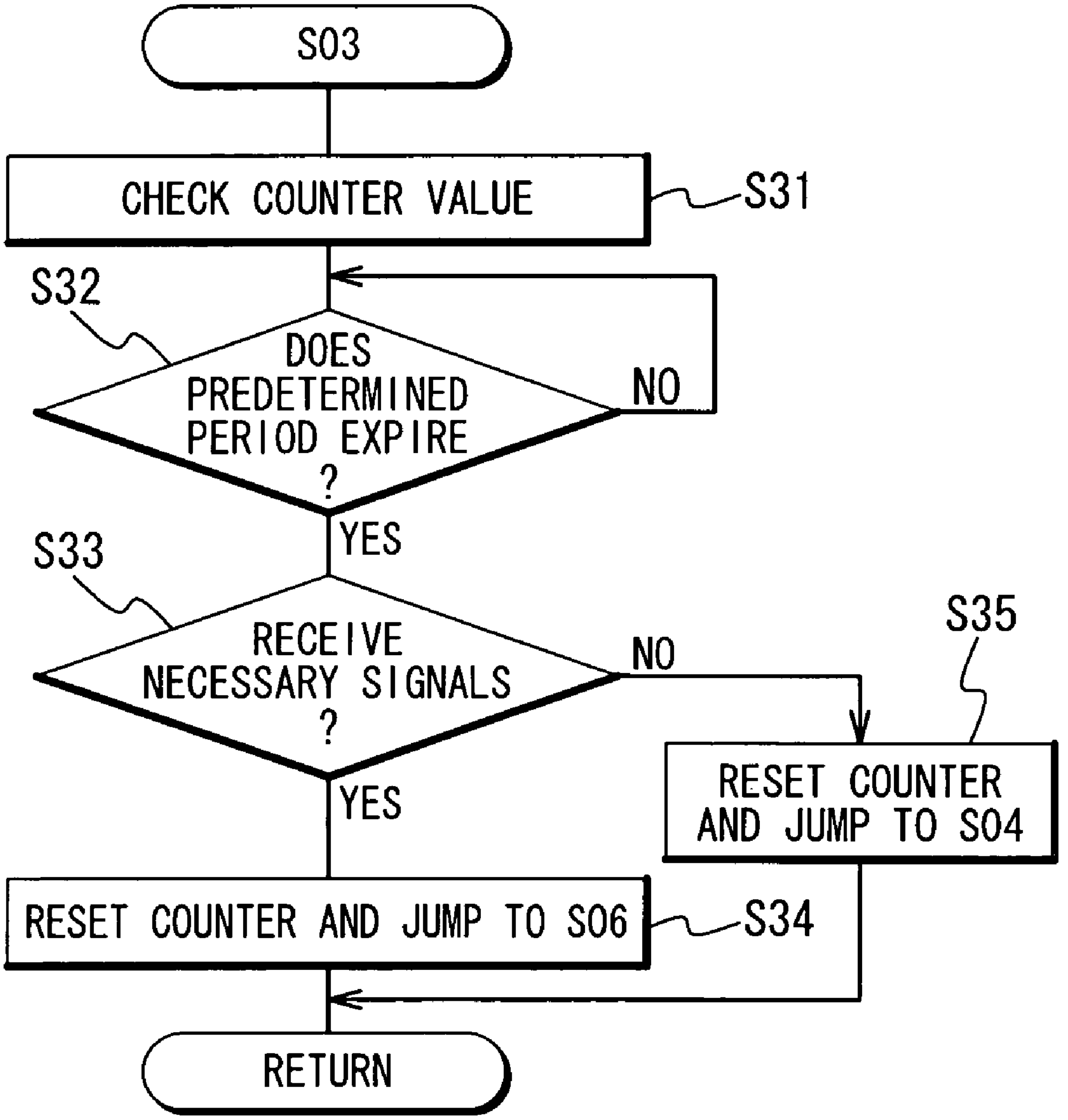
FIG. 7 is a flowchart illustrating the procedure of receiving interfacing signals within the distributed control system in this embodiment.

With reference to FIG. 7, each of the receiving controllers (including the meter panel 3) checks a counter value of the program counter within the control unit.

(2) Step S32

Each of the receiving controllers checks on the basis of the counter value whether a predetermined period expires. The predetermined period is stored in the control unit.

(3) Step S33

The receiving controller in the reception side checks whether or not it receives desired signals immediately after the predetermined period expires. For the engine controller 5 at Step S03, the desired signals include the shift lever signal.

(4) Step S34

When receiving the desired signals, each receiving controller resets the counter value of the program counter. The procedure is then continues to Step S06.

(5) Step S35

When not receiving any of the desired signals, the procedure continues to Step S04 after resetting the counter value of the program counter.

As described, the engine controller 5 monitors the vehicle speed signal and the vehicle speed limit signal from the vehicle control module 4, and generates the alarm signal when not receiving any of the vehicle speed signal and the vehicle speed limit signal. This allows the distributed control system 1 to detect the failure of the vehicle control module 4 and the associated forklift components without a special monitoring apparatus.

Additionally, the engine controller 5 executes the control processing using the substituting signals generated by the engine controller itself when not receiving necessary signals. This effectively achieves safe operation of the forklift in case of the failure of the vehicle control module 4.

(2) Operation of Vehicle Controller Module

The vehicle controller module 4 performs the control processing in a similar way to the engine controller 5 as described in the following.

(2-1) Step S01

Referring back to FIG. 5, the vehicle controller module 4 receives the forklift component signals SAI from the forklift components controlled by vehicle controller module 4. In this embodiment, the forklift component signals SAI includes a vehicle speed signal received from a vehicle speed sensor.

(2-2) Step S02

The vehicle controller module 4 exchanges signals with other desired controllers. The vehicle controller module 4 transmits the selected the forklift component signals SAI, and receives interfacing signals sai from the associated other controllers. In this embodiment, the vehicle controller module 4 forwards the vehicle speed signal and a vehicle speed limit signal (which is previously stored in the data storage unit 44) to the engine controller 5 at predetermined period intervals. The vehicle speed and vehicle speed limit signal are used by the destination, that is, the engine controller 5. Additionally, the vehicle controller module 4 receives the shift lever signal, which indicates the forklift to travel backward or reverse, or to be placed in the neutral state, from the meter panel 3 at predetermined period intervals.

(2-3) Step S03

The vehicle controller module 4 determines whether or not it receives the interfacing signals sai from the associated controllers during a predetermined period. In this embodiment, the vehicle controller module 4 determines whether it receives the shift lever signal from the meter panel 3 during a predetermined period. If the vehicle controller module 4 receives the shift lever signal during the period, the procedure continues to Step S06. Otherwise, the procedure continues to Step S04.

(2-4) Step S04

If not receiving the interfacing signals sai during the predetermined period, the vehicle controller module 4 generates an alarm signal. That is, in this embodiment, in response to not receiving the shift lever signal during the predetermined period, the vehicle controller module 4 generates an alarm signal and provides the alarm signal for a meter panel 3 and a security alarm connected to the CAN bus 9 (not shown). The meter panel 3 receives and displays the received alarm signal. In the case that the meter panel 3 does not work well, the security alarm generates an alarm in response to the alarm signal. The procedure then goes on to Step S05.

(2-5) Step S05

The vehicle control module 4 obtains the previously stored data in the data storage unit 44, and generates substituting signals to be used in the following steps in place of the interfacing signals sai on the basis of the stored data.

In this embodiment, the vehicle control module 4 generates a substituting shift lever signal on the basis of the stored data indicative of a predetermined shift lever position. The predetermined shift lever position is determined so as to ensure safe operation of the forklift. Instead, the stored data may be indicative of the last determined shift lever position. The substituting shift lever signal is used in the following Step S06 in place of the shift lever signal, which is not received at Step S01.

(2-6) Step S06

The vehicle control module 4 performs predetermined control processing to generate control signals in response to the interfacing signals sai received from the associated controllers or the substituting signals generated by the vehicle control module 4 itself. In this embodiment, the vehicle control module 4 produces a transmission control signal for controlling the transmission within the forklift for the forklift component control signals SBO in response to the shift lever signal from the meter panel 3, or the substituting shift lever signal generated by the vehicle control module 4 itself.

(2-7) Step S07

The vehicle control module 4 outputs the control signals generated at Step S06 to the associated forklift components. The vehicle control module 4 outputs the transmission control signal to the transmission to control solenoids of the transmission.

It should be noted that the aforementioned operation of the vehicle control module 4 is an example, and thus the operation may be modified. For example, the operation of the vehicle control module 4 is modified as follows: the vehicle control module 4 receives a sitting detection signal indicative of whether an operator is seated on the driver seat at Step S01. The vehicle control module 4 then receives the rotation speed signal from the engine controller 5, the rotation speed signal being indicative of the rotation speed of the engine 23. The vehicle control module 4 generates the transmission control signal in response to the rotation speed signal and the sitting detection signal at Step S06. Finally, the vehicle control module 4 outputs the transmission control signal to the transmission to control the solenoids of the transmission.

As described, the vehicle control module 4 monitors the shift lever signal received from the meter panel 3, and generates the alarm signal when not receiving the shift lever signal. This allows the distributed control system 1 to detect the failure of the meter panel 3 and the components associated with the shift lever.

Additionally, the vehicle control module 4 performs the control processing using the substituting signals generated by the vehicle control module 4 itself when not receiving necessary signals. This effectively achieves safe operation of the forklift in case of the failure of the meter panel 3 and the components associated with the shift lever.

(3) Operation of Meter Panel

The meter panel 3 also performs the similar control processing as described in the following.

(3-1) Step S01

With reference to FIG. 5, the meter panel 3 receives the forklift component state signals SFI from the associated forklift components. In this embodiment, the meter panel 3 receives the shift lever signal from the shift lever mechanism, the shift lever signal being indicative of the position of the shift lever, such as "drive", "reverse", and "neutral".

(3-2) Step S02

The meter panel 3 exchanges signals with other desired controllers. The meter panel 3 transmits the selected forklift component state signals SFI, and receives interfacing signals sfi from associated other controllers. In this embodiment, the meter panel 3 forwards the shift lever signal to the vehicle control module 4 at predetermined period intervals. The shift lever signal is used by the destination, that is, the vehicle control module 4. Additionally, the meter panel 3 receives the vehicle speed signal from the vehicle control module 4 at predetermined period intervals.

(3-3) Step S03

The meter panel 3 determines whether or not it receives the interfacing signals sci from the associated controllers during a predetermined period. In this embodiment, the meter panel 3 determines whether it receives the vehicle speed signal from the vehicle control module 4 during a predetermined period. If the meter panel 3 receives the vehicle speed signal during the period, the procedure continues to Step S06. Otherwise, the procedure continues to Step S04.

(3-4) Step S04

If not receiving the interfacing signals sci during the predetermined period, the meter panel 3 generates an alarm signal. That is, in this embodiment, in response to not receiving the vehicle speed signal during the predetermined period, the meter panel 3 generates and displays an alarm signal. Instead, the meter panel 3 may output the alarm signal to the security alarm connected to the CAN bus 9. The procedure then goes on to Step S05.

(3-5) Step S05

The meter panel 3 obtains the previously stored data in the data storage unit 34, and generates substituting signals to be used in the following steps in place of the interfacing signals sci on the basis of the stored data. The previously stored data are prepared for dealing with failure of the controllers.

In this embodiment, the meter panel 3 generates a substituting vehicle speed signal on the basis of the stored data indicative of a predetermined speed. The substituting vehicle speed signal is used in the following Step S06 in place of the vehicle speed signal, which is not received at Step S01. The predetermined speed is determined so as to ensure safe operation of the forklift.

(3-6) Step S06

The meter panel 3 performs predetermined control processing to generate control signals in response to the interfacing signals sfi received from the associated controllers or the substituting signals generated by the meter panel 3 itself. In this embodiment, the meter panel 3 produces a speed display control signal used for displaying the vehicle speed.

(3-7) Step S07

The meter panel 3 outputs the control signals generated at Step S06 to the associated components. The meter panel 3 outputs the speed display control signal to a display device to display the vehicle speed on a display screen.

As described, the meter panel 3 monitors the vehicle speed signal received from the vehicle control module 4, and generates the alarm signal when not receiving the vehicle speed signal. This allows the distributed control system 1 to detect the failure of the vehicle control module 4 and the components associated with the vehicle control module 4.

(4) Operation of Vehicle Control Module for System with FC Controller

For the distributed control system 1 with the FC controller 8, the operation of the vehicle control module 4 is modified as described below.

(4-1) Step S01

Referring back to FIG. 5, the vehicle controller module 4 receives the forklift component signals SAI from the forklift components controlled by vehicle controller module 4. In this embodiment, the forklift component signals SAI includes a vehicle speed signal received from a vehicle speed sensor.

(2-2) Step S02

The vehicle controller module 4 exchanges signals with other desired controllers. The vehicle controller module 4 transmits the selected the forklift component signals SAI, and receives interfacing signals sai from the associated other controllers. In this embodiment, the vehicle controller module 4 forwards the vehicle speed signal and a vehicle speed limit signal to the engine controller 5 at predetermined period intervals. The vehicle speed and vehicle speed limit signal are used by the destination, that is, the engine controller 5. Additionally, the vehicle controller module 4 receives a fork control signal and a mast control signal from the FC controller 8 at predetermined time intervals, the fork control signal being used for controlling the forks, and the mast control signal being used for controlling the mast. Each of the received control signals may include instructions for indicating the vehicle controller module 4 to keep the state of the forks or the mast unchanged.

(4-3) Step S03

The vehicle controller module 4 determines whether or not it receives the interfacing signals sai from the associated controllers during a predetermined period. In this embodiment, the vehicle controller module 4 determines whether it receives the fork control signal and the mast control signal from the FC controller 8 during a predetermined period. If the vehicle controller module 4 receives the fork and mast control signals during the period, the procedure continues to Step S06. Otherwise, the procedure continues to Step S04.

(2-4) Step S04

If not receiving the interfacing signals sai during the predetermined period, the vehicle controller module 4 generates an alarm signal.

That is, in this embodiment, in response to not receiving fork and mast control signals during the predetermined period, the vehicle controller module 4 generates an alarm signal and provides the alarm signal for the meter panel 3. The meter panel 3 receives and displays the received alarm signal. The procedure then goes on to Step S05.

(2-5) Step S05

The vehicle control module 4 obtains the previously stored data in the data storage unit 44, and generates substituting signals to be used in the following steps in place of the interfacing signals sai on the basis of the stored data.

In this embodiment, the vehicle control module 4 generates a substituting fork control signal and a substituting mast control signal on the basis of the stored data indicative of predetermined fork and mast positions. The predetermined fork and mast positions are determined so as to ensure safe operation of the forklift. Instead, the stored data may be indicative of the last determined fork and mast positions. The substituting fork and mast control signals are used in the following Step S06 in place of the fork and mast control signals, which are not received at Step S01.

(2-6) Step S06

The vehicle control module 4 performs predetermined control processing to generate control signals in response to the interfacing signals sai received from the associated controllers or the substituting signals generated by the vehicle control module 4 itself. In this embodiment, the vehicle control module 4 generates the forklift component control signals SBO so as to be identical to the fork and mast control signals received from the FC controller 8 or the substituting fork and mast control signals generated by the vehicle control module 4 itself.

(2-7) Step S07

The vehicle control module 4 outputs the control signals generated at Step S06 to the associated forklift components. The vehicle control module 4 outputs the fork and mast control signals or the substituting fork and mast control signals to the fork and mast operating mechanisms to control the movement of the forks and the mast.

Advantages of the System

The distribution control system in this embodiment has various advantages as described in the following.

Firstly, the distribution control system in this embodiment achieves mutual monitoring among the controllers through exchanging signals and monitoring the exchanged signals. This enables cooperative operation of the controllers within the distribution control system.

Secondly, the architecture of the distribution control system facilitates the detection of the failure of the controllers, and the determination of the failed location. The architecture also facilitates the recovery from the failure of the controllers. The failure can be remedied through only replacing the failed controller. This effectively reduces the cost of the remedies of the system.

Thirdly, the architecture of the distribution control system effectively improves flexibility. The distribution control system only requires exchanging associated controllers to provide a large number of models or optional accessories. Additionally, the architecture of the distribution control system allows the controllers to be independently maintained.

Fourthly, the distribution control system in this embodiment is advantageous for reducing the size of the control system. The distribution of the functions allows each of the controllers within the system to have a reduced size. This allows a size-reduced forklift to be installed with the distribution control system.

Finally, the distribution control system effectively facilitates the routing of the cables between the controllers and the controlled components. This is also effective for improving ease of handling the cables. The improved routing of the cables is also effective for improving noise resistance through reduction in the lengths of the cables.

Although the invention has been described in its preferred form with a certain degree of particularity, it is understood that the present disclosure of the preferred form has been changed in the details of construction and the combination and arrangement of parts may be resorted to without departing from the scope of the invention as hereinafter claimed.

What is claimed is:

1. A distributed control system comprising:

a plurality of controllers mounted on a forklift, said controllers for controlling corresponding functions of the forklift; and a network for providing connections among said plurality of controllers, wherein:

a first controller of said plurality of controllers is configured to control a corresponding function of the forklift in response to an interface signal received from a second controller of said plurality of controllers; and when the interface signal is not received from said second controller within a predetermined time period, said first controller controls the corresponding function of the forklift according to data stored thereon rather than controlling the corresponding function of the forklift in response to the interface signal.

2. The distributed control system according to claim 1, further comprising a display unit connected to said network, wherein the forklift includes internal combustion engine, one of said first and second controllers is an engine controller, and another of said first and second controllers is a vehicle controller, said vehicle controller generates a plurality of forklift component control signals for controlling forklift components in response to forklift component signals received from forklift components of the forklift, said engine controller generates a plurality of engine control signals for controlling the internal combustion engine in response to a plurality of engine signals received from engine components of the internal combustion engine, and said display unit displays at least one of the plurality of forklift component signals, the plurality of forklift component control signals, the plurality of engine signals, and the plurality of engine control signals.

3. The distributed control system according to claim 2, wherein said vehicle controller outputs at least one forklift component signal, selected from the plurality of forklift component signals, to said engine controller, and outputs the plurality of forklift component control signals, and said engine controller is configured to receive the selected forklift component signal as the interface signal, and is configured to generate at least one of the plurality of engine control signals in response to the selected forklift component signal.

4. The distributed control system according to claim 3, wherein said engine controller uses data stored thereon rather than the selected forklift component signal to generate a first alarm signal, when the selected forklift component signal is not received within a predetermined time period, and said display unit displays, in response to the first alarm signal, a first alarm notification that said engine controller did not receive the selected forklift component signal.

5. The distributed control system according to claim 3, wherein the at least one selected forklift component signal includes a vehicle speed signal indicating a speed of the forklift includes a vehicle speed limit signal indicating a speed limit of the forklift, the plurality of engine signals includes an accelerator sensor signal indicating a state of an accelerator pedal of the forklift, the plurality of engine control signals includes a fuel injection rate signal indicating an injection rate of the internal combustion engine, and said engine controller generates the fuel injection rate signal in response to the vehicle speed signal, the vehicle speed limit signal, and the fuel injection rate signal.

6. The distributed control signal according to claim 2, wherein said engine controller outputs an engine signal, selected from the plurality of engine signals, to said vehicle controller, and outputs the plurality of engine control signals, and said vehicle controller is configured to receive the selected engine signal as the interfacing signal, and is configured to generate at least one of the plurality of forklift component control signals in response to the selected engine signal.

7. The distributed control system according to claim 6, wherein said vehicle controller uses data stored thereon rather than the selected engine signal to generate a second alarm signal, when the selected engine signal is not received within a predetermined time period, and said display unit displays, in response to the second alarm signal, a second alarm notification that said vehicle controller did not receive the selected engine signal.

8. The distributed control system according to claim 6, wherein the selected engine signal includes a rotation speed signal indicating a rotation speed of the internal combustion engine, the plurality of forklift component signals includes a sitting detection signal indicating whether an operator is seated on a driver seat of the forklift, the plurality of forklift component control signals includes a transmission control signal for controlling a transmission of the forklift, and said vehicle controller generates the transmission control signal in response to the rotation speed signal and the sitting detection signal.

9. The distributed control system according to claim 2, wherein said plurality of controllers includes a finger chip controller for controlling a finger chip control module, and said finger chip control module is disposed beside a driver seat of the forklift and is operable to control forks and a mast of the forklift in response to an actuation of a finger-operable lever of said finger chip control module.

10. The distributed control system according to claim 2, wherein said engine controller is disposed beside the internal combustion engine, and said vehicle controller is positioned immediately inside a pivotable hatch of a body of the forklift.

11. A forklift comprising:

a forklift body; and a distributed control system including:

a plurality of controllers mounted on said forklift body, said controllers for controlling corresponding functions of said forklift; and a network for providing connections among said plurality of controllers, wherein:

a first controller of said plurality of controllers is configured to control a corresponding function of said forklift in response to an interface signal received from a second controller of said plurality of controllers; and when the interface signal is not received from said second controller within a predetermined time period, said first controller controls the corresponding function of said forklift according to data stored thereon rather than controlling the corresponding function of said forklift in response to the interface signal.

12. A method of operating a distributed control system within a forklift, the method comprising:

transmitting an interface signal to a first controller of a plurality of controllers from a second controller of the plurality of controllers, the plurality of controllers being connected through a network and being configured to control corresponding functions of the forklift;

first controlling a first function of the forklift using the first controller in response to the interface signal; and when the interface signal is not received from the second controller within a predetermined time period, second controlling the first function of the forklift using the first controller according to data stored thereon rather than controlling the corresponding function of the forklift in response to the interface signal.

13. The method according to claim 12, further comprising:

displaying an alarm on a display screen of a display unit connected to the network when the first controller does not receive the interface signal within the predetermined time period, wherein one of the first and second controllers is an engine controller, and another of the first and second controllers is a vehicle controller, and the method further comprises:

using the vehicle controller to generate a plurality of forklift component control signals for controlling forklift components of the forklift; and using the engine controller to generate a plurality of engine control signals for controlling an engine of the forklift in response to a plurality of engine signals received from engine components of the engine.

14. The method according to claim 13, wherein said transmitting of the interface signal includes using the vehicle controller to output at least one forklift component signal, selected from the plurality of forklift component signals, to the engine controller, and to output the plurality of forklift component control signals, and said first controlling of the first function includes generating at least one of the engine control signals in response to the selected forklift component signal output from the engine controller.

15. The method according to claim 14, wherein said second controlling of the first function includes using the data stored on the first controller rather than the selected forklift component signal when the selected forklift component signal is not received within the predetermined time period, and said displaying of the alarm includes:

outputting a first alarm signal to the display unit from the vehicle controller; and displaying a first alarm for providing notification that the engine controller did not receives the selected forklift component signal in response to the first alarm signal.

16. The method according to claim 14, further comprising:

indicating a speed of the forklift according to a vehicle speed signal of the at least one selected forklift component signal;

indicating a speed limit of the forklift according to a vehicle speed limit signal of the at least one selected forklift component signal;

indicating a state of an accelerator pedal of the forklift according to an accelerator sensor signal of the plurality of engine signals;

indicating an injection rate of the engine according to a fuel injection rate signal of the plurality of engine control signals; and generating the fuel injection rate signal using the engine controller and in response to the vehicle speed signal, the vehicle speed limit signal, and the fuel injection rate signal.

17. The method according to claim 13, wherein said transmitting of the interface signal includes using the engine controller to output an engine signal, selected from the plurality of engine signals, to the vehicle controller, and to output the plurality of engine control signals, and said first controlling of the first function includes generating at least one of the plurality of forklift component control signals in response to the selected engine signal output from the vehicle controller.

18. The method according to claim 17, wherein said second controlling of the first function includes using the data stored on the first controller rather than the selected engine signal when the selected engine signal is not received within the predetermined time period, and said displaying of the alarm includes:

generating a second alarm signal when the vehicle controller does not receive the selected engine signal within the predetermined time period; and displaying a second alarm for providing a notification that the vehicle controller did not received the selected engine signal in response to the second alarm signal.

19. The method according to claim 17, further comprising:

indicating a rotation speed of the engine according to a rotation speed signal of the selected engine signal;

indicating whether an operator is seated on a driver seat of the forklift according to a sitting detection signal of the plurality of forklift component signals;

controlling a transmission of the forklift according to a transmission control signal of the plurality of forklift component control signals; and using the vehicle controller to generate the transmission control signal in response to the rotation speed signal and the sitting detection signal.

20. A computer program stored on a computer-readable storage medium, the computer program for operating a distributed control system including a plurality of controllers connected through a network, the computer program causing a computer to execute a method comprising:

transmitting an interface signal to a first controller of the plurality of controllers from a second controller of the plurality of controllers;

first controlling a first function of the forklift using the first controller in response to the interface signal; and when the interface signal is not received from the second controller within a predetermined time period, second controlling the first function of the forklift using the first controller according to data stored thereon rather than controlling the corresponding function of the forklift in response to the interface signal.

21. The computer program according to claim 20, wherein the method further comprises:

displaying an alarm on a display screen of a display unit connected to the network when the first controller does not receive the interface signal within the predetermined time period.

* * * * *